Dec. 11, 1934.  R. C. BAKER  1,984,107
DRILL PIPE FLOAT
Filed June 22, 1932  2 Sheets-Sheet 2
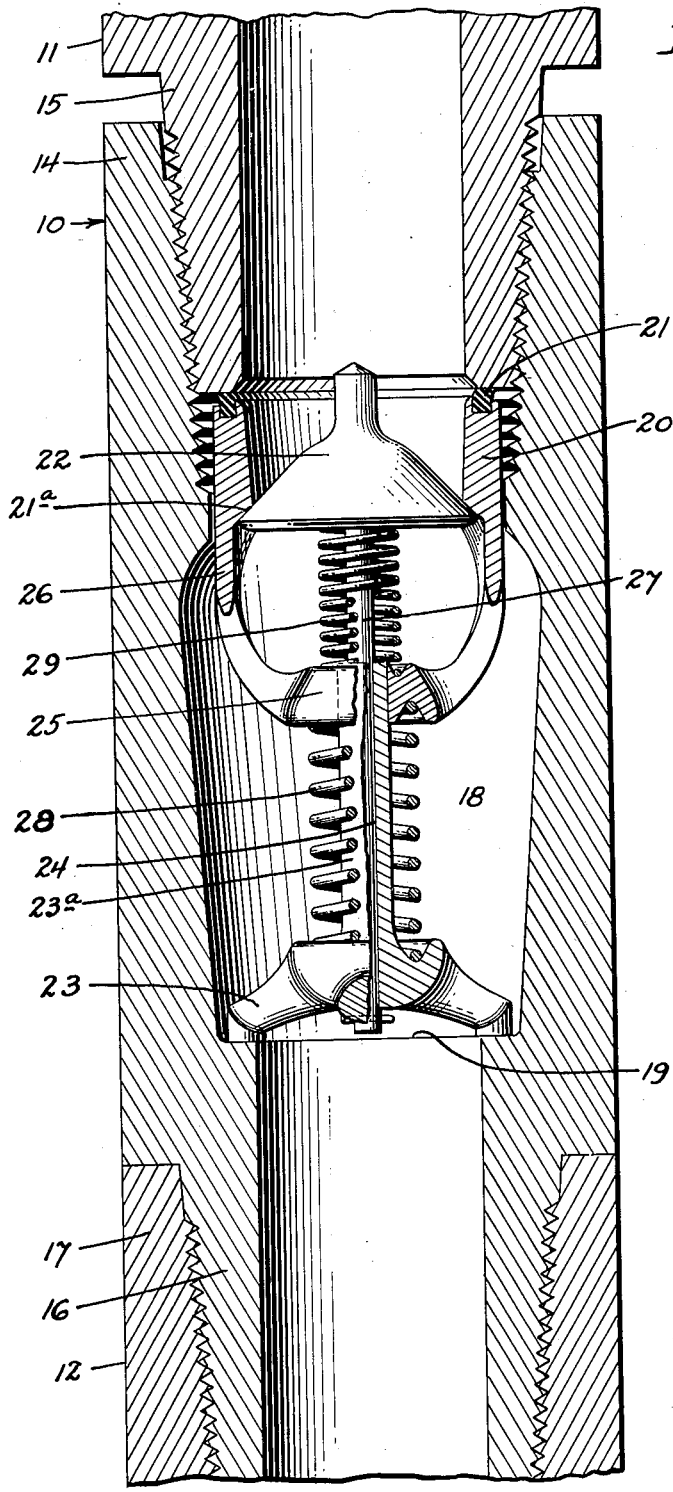
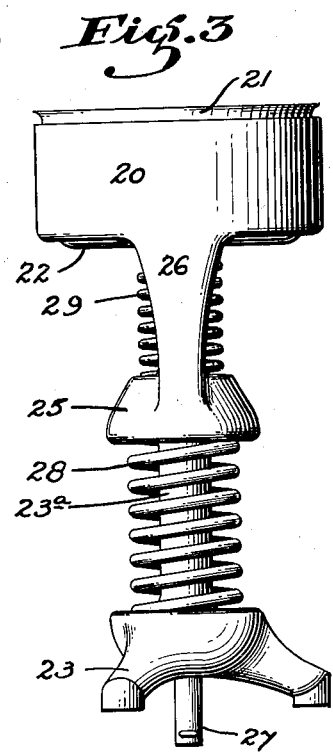
INVENTOR.
Reuben C. Baker.
BY Townsend and Loftus
ATTORNEYS.

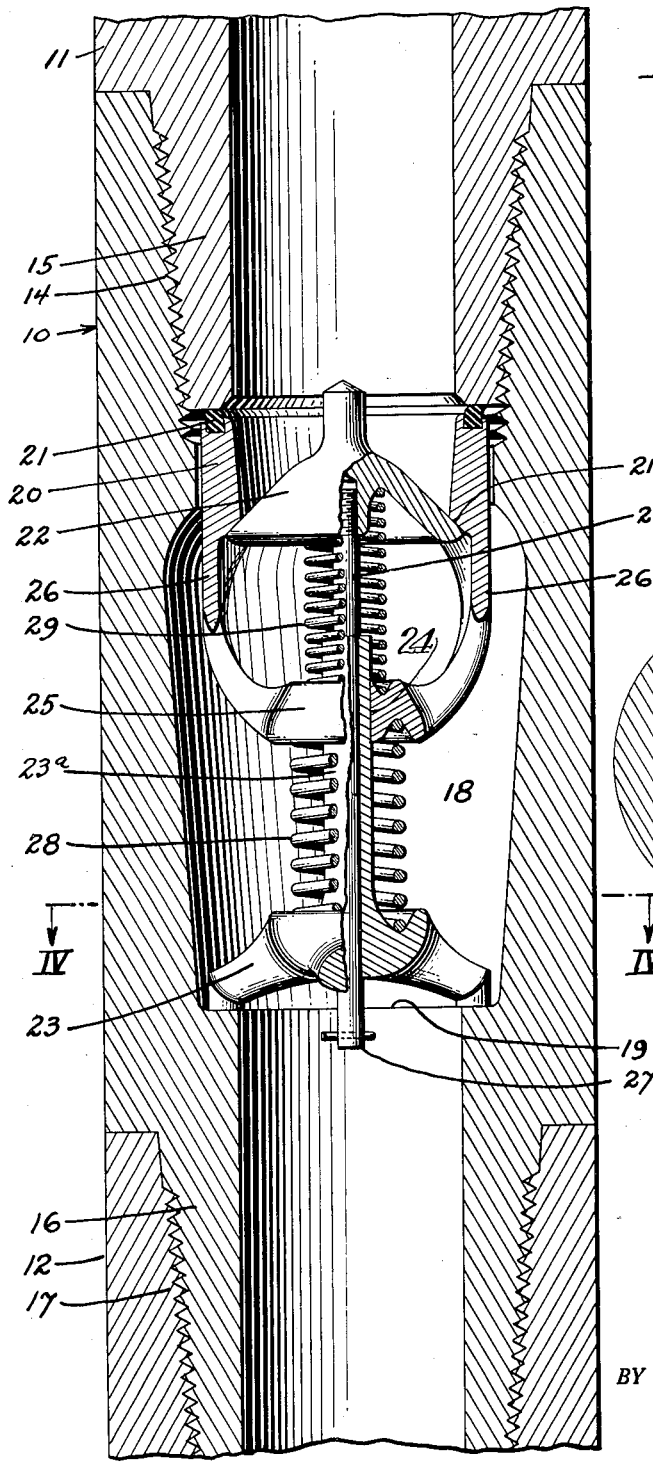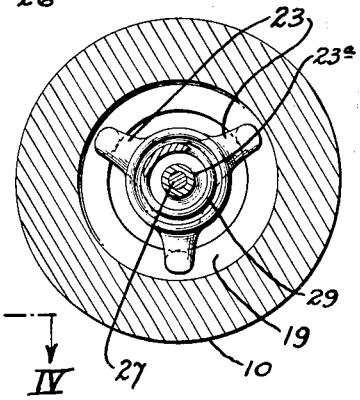

Patented Dec. 11, 1934

1,984,107

UNITED STATES PATENT OFFICE 1,984,107

DRILL PIPE FLOAT

Reuben C. Baker, Coalinga, Calif., assignor to Baker Oil Tools, Inc., Huntington Park, Calif., a corporation of California Application June 22, 1932, Serial No. 618,689

3 Claims. (Cl. 137—69)

This invention relates to rotary drilling equipment for deep wells and particularly pertains to what is known as a drill pipe float of the character disclosed in my United States Letters Patent entitled "Well drill pipe float coupling", #1,631,509 issued June 7, 1927.

This prior patent referred to includes a valve cage threaded into a drill pipe coupling or body forming a part of a tool joint. A back pressure valve is carried by the cage to permit circulating fluid to be pumped downwardly through the drill string but preventing passage of fluid upwardly through the string when running the same in the hole and thus effecting what is termed a "floating in" action.

It is the principal object of the present invention to improve devices of the character referred to by providing a valve assembly including a valve cage and cooperating valve which is loosely mounted in a body to be interposed between the two sections of a tool joint and may be easily and quickly inserted therein and removed therefrom, and which is properly secured in operating position upon assembly of the body in the tool joint.

One form which the invention may assume is exemplified in the following description and illustrated by way of example in the accompanying drawings, in which:

Fig. 1 is a view in longitudinal section through a tool joint showing my improved float mechanism assembled therein.

Fig. 2 is a view similar to Fig. 1 with the exception that the tool joint is partially "broken" showing the manner in which a fluid tight seal is effected between the valve cage and the pin of the tool joint.

Fig. 3 is a view in elevation of my valve assembly.

Fig. 4 is a transverse section taken on line IV—IV of Fig. 1.

Referring more particularly to the accompanying drawings, 10 indicates a body or sub which is adapted to be interposed between the two sections 11 and 12 of a tool joint. It will be noticed that the body 10 is of the same exterior diameter as the tool joint and that it is formed at its upper end with a box 14 to receive the pin 15 of the upper half of the tool joint. The lower end of the body 10 is formed with a pin 16 adapted to be received in the box 17 of the lower half of the tool joint.

The body 10 is hollow in order that circulating fluid may be pumped directly through the drill string to the tools. Intermediate the ends of the body 10, the interior thereof is enlarged to form a chamber 18. At the lower end of this chamber is an annular shoulder 19 formed by reason of the difference in diameters of the chamber 18 and the passageway through the pin 16. It will be seen from the drawings, that at the upper end of the chamber the interior of the body is of a diameter less than the chamber 18.

Arranged within the body is a valve cage 20 which is cylindrical in form and which is of a diameter a little less than the diameter of the reduced bore at the upper end of the chamber 18. At its upper end this valve cage 20 is fitted with an annular packing member or gasket 21, which is adapted to be engaged with the pin end 15 of the upper half or section of the tool joint.

Formed at the lower end of the cage 20 is a valve seat 21a with which a valve member 22 cooperates. Bearing on the shoulder 19 is a spider 23 having an upwardly projecting central trunnion 23a. This trunnion projects through a bore 24 of a guide 25 which is disposed at a distance below the valve cage 20 and rigidly connected thereto by means of two downwardly depending arms 26. The trunnion 23a is formed with a longitudinal bore in which a valve stem 27 is reciprocably mounted. The valve stem is secured at its upper end to the valve member 22. A spring 28 is interposed between the guide 25 and the spider 23 and constantly tends to urge the valve cage 20 upwardly. A spring 29 is interposed between the guide 25 and the valve member 22 which constantly tends to maintain the valve member 22 seated on the seat 21a. The spring 28 is constructed heavier than the spring 29.

In operation of the device, the body 10 is constructed as shown in the drawings. The valve assembly which comprises the cage 20, the spider 23, the valve and stem 27 and the springs 28 and 29 is loosely set or inserted in the body 10 with the spider 23 resting on the shoulder 19. The upper half of the tool joint 11 is assembled on the body 10 as shown in Fig. 2. The spring 28 will cause the valve cage to be positioned where it will be engaged by the lower end of the pin 15 of the tool joint section 11. As the pin 15 is threaded downwardly in the body 10, it will of course engage the gasket at the upper end of the cage 20 and will force the cage 20 downwardly into the body 10 against the action of the spring 28. This will form a fluid tight seal between the upper end of the cage 20 and the lower face of the pin 15. The tool joint and the body 10 are then assembled in the drilling string and the latter is run in the hole. It will be seen that any fluid passing upwardly through the drill stem will be prevented from passing through the tool joint by the upwardly seating valve 22 in the cage 20 and therefore a "floating in" action will be obtained.

When it is desired to pump circulating fluid downwardly through the drill string, the pump pressure will overcome the spring 29 and move the valve 22 to an open position. As the spring 29 is of a lesser strength than the spring 28, the circulating fluid pressure in no way affects the position of the valve cage 20.

When the drilling string is removed from the hole, the upper section 11 of the joint may be disconnected from the body 10 and the entire valve assembly may be quickly removed from the body 10 for inspection or repairs. To reassemble the joint, it is only necessary to slip the valve assembly back into the body and to assemble the body in the tool joint. It should be pointed out that the greatest diameter of the spider 23 is less than any interior diameter of the body 10 above the shoulder 19.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In combination with a tool joint having one section with a box formed in its upper end to receive the pin of the uppermost section, the former section being formed with an interior annular shoulder at a substantial distance below the box, a hollow cylindrical valve cage adapted to fit coaxially within said section at the lower end of the box and to have its upper end engaged by the pin when the latter is threaded into the box, said valve cage being open ended and having a valve seat formed at its lowermost end, a guide positioned below the valve cage and coaxially thereof and connected thereto by depending arms, a spider adapted to bear on said interior annular shoulder and having an upwardly projecting trunnion reciprocably engaging a bore in said guide, an upwardly seating valve member cooperating with said valve seat, said valve having a downwardly depending stem reciprocably mounted in said trunnion, an expansion spring between the valve member and said guide, and an expansion spring between said guide and said spider, the former spring requiring less pressure to collapse it than the latter spring.

2. In combination with a tool joint having one section with a box formed in its upper end to receive the pin of the uppermost section, the former section being formed with an interior annular shoulder at a substantial distance below the box, a hollow cylindrical valve cage adapted to fit coaxially within said section at the lower end of the box and to have its upper end engaged by the pin when the latter is threaded into the box, said valve cage being open ended and having a valve seat formed at its lowermost end, a guide positioned below the valve cage and coaxially thereof and connected thereto by depending arms, a spider adapted to bear on said interior annular shoulder and having an upwardly projecting trunnion reciprocably engaging a bore in said guide, an upwardly seating valve member cooperating with said valve seat, said valve having a downwardly depending stem reciprocably mounted in said trunnion, an expansion spring between the valve member and said guide, and an expansion spring between said guide and said spider, the former spring requiring less pressure to collapse it than the latter spring, and sealing means carried by said cage to prevent the passage of fluid between the exterior of the cage and the interior of said section.

3. In combination with a tool joint, a cylindrical hollow body adapted to be interposed between the upper and lower joints of said tool joint, said hollow body having a box formed in its uppermost end to receive the pin end of the upper joint, said hollow body being formed with an interior annular shoulder at a substantial distance below the box, a hollow cylindrical open ended valve cage arranged coaxially within said body and having an exterior diameter slightly less than the interior diameter of the body at a point contiguous to the lower end of the box, the upper end of said valve cage being adapted to be engaged by the lower end of the pin of the upper joint when the latter is threaded into the box, said cylindrical cage having a valve seat formed at its lower end, a pair of arms depending from the lower end of the cage, a guide spaced a substantial distance below the lower end of the cage and held coaxially of the cage by said arms, a spider adapted to bear on said interior annular shoulder, a trunnion secured to said spider and projecting upwardly and slidably projecting through said guide, a valve member adapted to seat upwardly against said valve seat, said valve having a stem slidably mounted in said trunnion, a spring interposed between said guide and said valve member, a spring interposed between said guide and said spider, the first named spring being relatively weak in comparison with the latter named spring, and sealing means carried by the upper portion of said valve cage to prevent the passage of fluid between the exterior of the valve cage and the interior of the body when the valve cage is assembled in the body and the body is assembled between the tool joints.

REUBEN C. BAKER.